Feb. 13, 1940. J. MULLER 2,189,991
APPARATUS FOR CLOSING TANKS
Filed Aug. 13, 1936 3 Sheets-Sheet 1
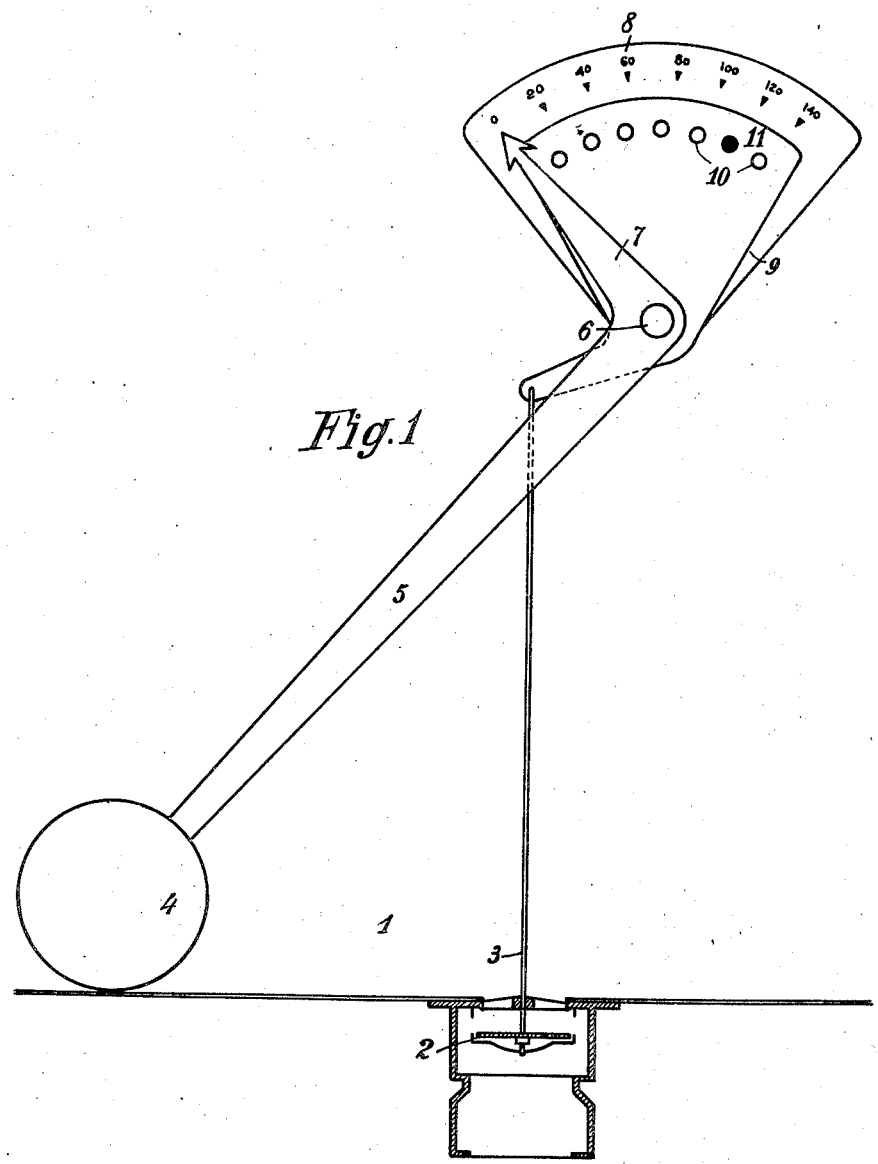
INVENTOR
JACQUES MULLER
By Emil Bönnelycke
ATTORNEY Feb. 13, 1940. J. MULLER 2,189,991
APPARATUS FOR CLOSING TANKS
Filed Aug. 13, 1936 3 Sheets-Sheet 2
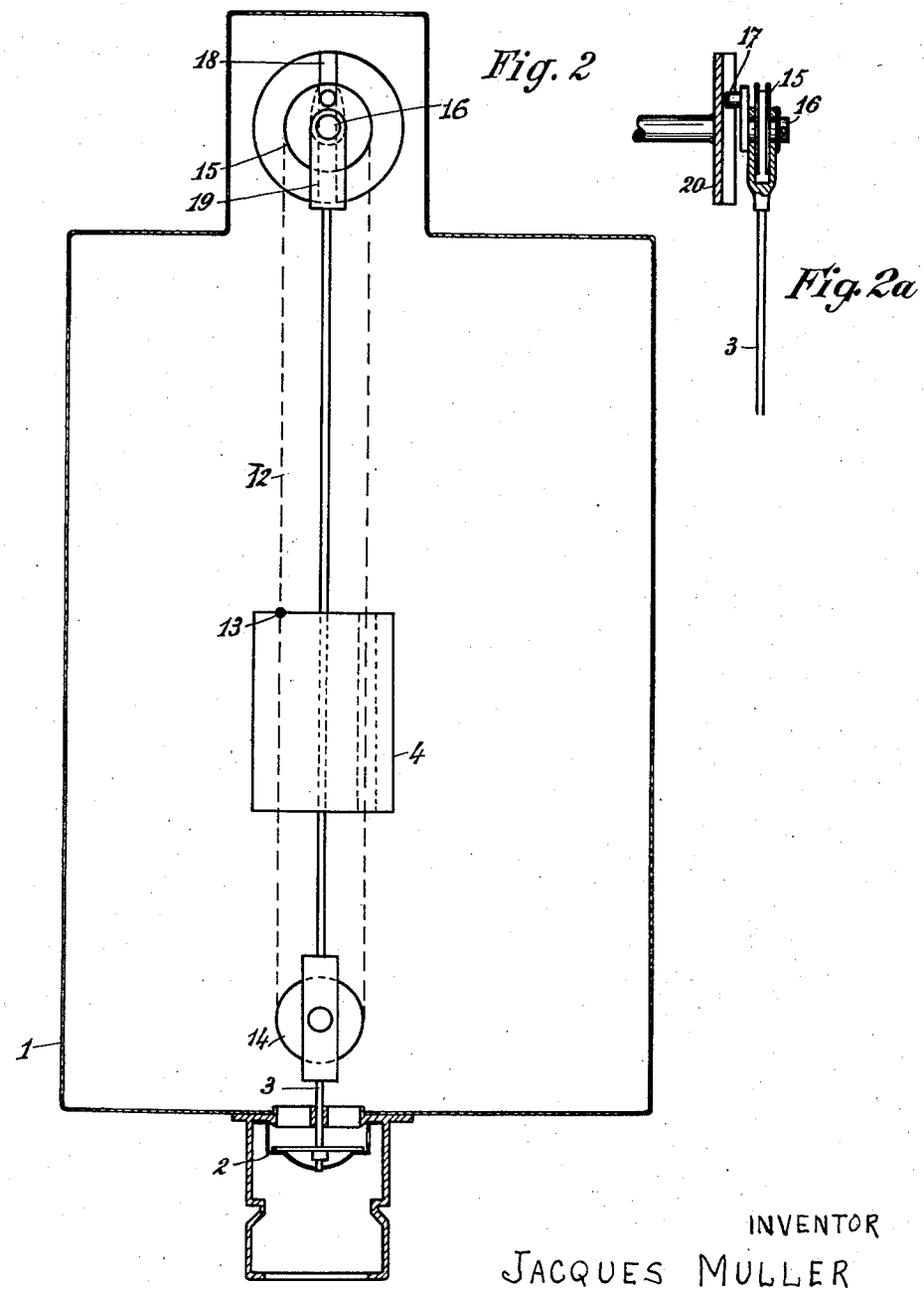
INVENTOR
JACQUES MULLER
By Emil Bönnelycke
ATTORNEY

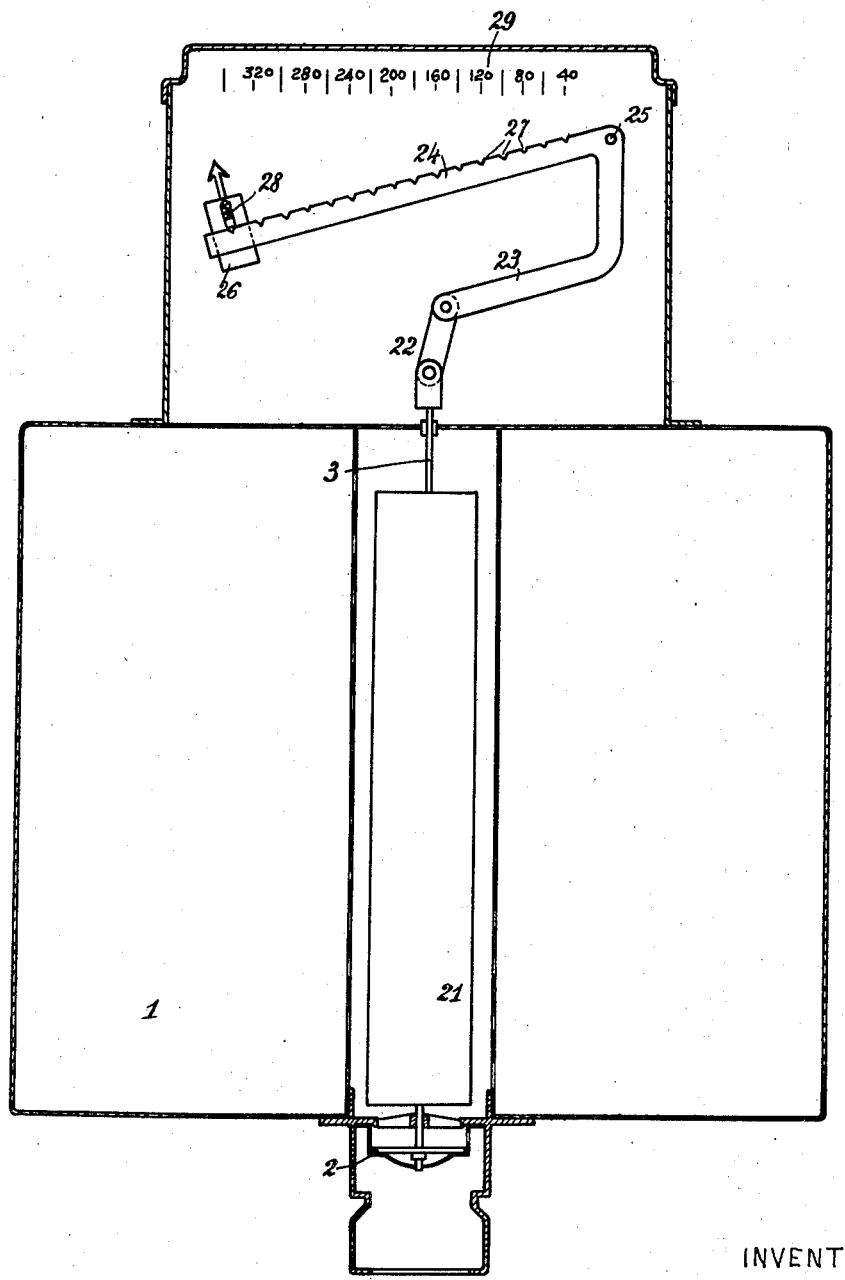

Patented Feb. 13, 1940

2,189,991

UNITED STATES PATENT OFFICE 2,189,991

APPARATUS FOR CLOSING TANKS

Jacques Muller, La Garenne Colombes, France

Application August 13, 1936, Serial No. 95,941
In France August 30, 1935

1 Claim. (Cl. 137—68)

The closure devices known hitherto for liquid tanks are adjusted manually and once the adjustment has been made it is not possible to vary the adjustment.

The object of the present invention is to provide a novel form of closure device which can be adjusted instantaneously, even at a distance, to the liquid level which it is desired to obtain in the tank after filling.

Another feature of the invention is to provide for the control of the filling operation, even from a distance.

In principle the method consists in causing the closure device to operate only after a predetermined and adjustable filling of the tank, the time during which the filling takes place being regarded as neutral, the various parts of the closure mechanism being allowed, during this period of time, to follow the physical or mechanical laws to which they are subjected.

The same also applies to the external controlling means.

The devices for carrying out the method according to the invention are preferably of the type provided with a float or of the type provided with a body immersed in the liquid, the float or body being subjected to the thrust of the liquid into which it dips.

In apparatus of the first type the float may have a fixed or variable position relatively to its rod. In the first case the float follows the movement of the liquid until a predetermined level is reached, whereupon it is connected to the closure device so as to operate the latter, whilst an indicating pointer serves to indicate the degree of filling. In the second case the float moves freely until a predetermined level of liquid is reached, whereupon it comes into operation.

In apparatus of the second type the thrust of the liquid on the dipping body is neutralised by a counterweight or a slide, of a hinged system controlling the closure device, until the thrust exceeds the condition of static equilibrium, which occurs at the moment at which the liquid level reaches the pre-adjusted height.

The invention will now be described by way of example with reference to the accompanying drawings, wherein:

Fig. 1 shows a device with a float which is fixed to its rod;

Fig. 2 shows a device with a float which is movable on its rod;

Fig. 2a is a sectional view, with parts broken away, of the pulley arrangement shown in Fig. 2; and, Fig. 3 shows a device with a dipping body.

In the drawings, in which the same references indicate the same parts, 1 is the tank to be filled, 2 the closure device and 3 its operating rod.

In the method of construction shown in Fig. 1, a float 4, fixed on its rod 5, rotatably mounted at 6, actuates a pointer 7 moving in front of a graduated and stationary scale 8. The rod 3 of the closure device is connected at the upper end to a movable scale 9 which is not graduated but is provided with holes 10. Into these holes are placed pins with which the pointer 7 can come into contact. When, for example, a pin is placed in the hole 11 of the movable scale 9, corresponding with the graduation 120 of the stationary scale 8, the float 4 follows the movement of the liquid during filling and when the pointer 7, which it actuates, comes into contact with the pin in the hole 11 it causes the closure device 2 to function.

In the form of construction in Fig. 2, the float 4 can move along the rod 3 of the closure device, and is secured at 13 to the endless cable or chain 12 which passes around pulleys 14 and 15. By varying the position of the pulley 15 and thus the height to which the float can move freely on the rod 3, there is adjusted the level which the liquid must reach before the float moves the closure device 2 into its closed position. For this purpose the shaft 16 of the pulley 15 carries a projection 17 which can move between guide members 18, 19 on a plate 20 secured to the tank 1.

In the form of construction shown in Fig. 3 the rod 3 of the closure device supports a cylindrical body 21 dipping into the liquid. The rod 3 is connected at the upper end to a system of levers 22, 23, 24, with an axis of rotation at 25, on the bar 24 of which there is movably mounted a slide 26 which is adjustable in position by means of a resilient finger 28 thereon which engages with notches 27 in the bar 24. It will be seen that when the thrust exerted by the liquid on the body 21 exceeds the state of static equilibrium of the connecting system the closure device 2 is moved into its closed position. Graduations 29 corresponding with the notches 27 enable the operation of the device to be suitably adjusted.

It will be understood that the invention is not limited to the arrangement illustrated, thus, for example, the systems of transmission are only given by way of indication and may be so arranged as to be operable from a distance by any system of appropriate type. Also the number of floats and dipping bodies may be varied and they may be combined for counterbalancing the possible inclination of the tanks.

I claim:

An apparatus for controlling the level of liquid in a reservoir, comprising a reservoir having a liquid supply opening in one wall thereof, a valve seat in said opening, a valve associated with said seat, a rod extending vertically through said reservoir and axially through said valve seat, said valve being carried by the lower end of said rod, an elongated vertical float carried by said rod within said reservoir, a cage surrounding said float in said reservoir, a lever pivotally mounted on a horizontal axis, means connecting the upper end of said rod to said lever to transmit the lifting movement of said float to said lever, and a counterweight on said lever to oppose the lift of said float.

JACQUES MULLER.